(12) United States Patent
Deisinger et al.

(10) Patent No.: US 7,235,018 B2
(45) Date of Patent: Jun. 26, 2007

(54) BELLOWS FOR SLIDING CONSTANT VELOCITY JOINTS

(75) Inventors: Markus Deisinger, Seigburg (DE); Thomas Schmidt, Marlbrock (GB); Joachim Wette, Hennef (DE); Thorsten Scholtz, Bad Honnef (DE)

(73) Assignee: GKN Driveline International GmbH (DE)

( * ) Notice: Subject to any disclaimer, the term of this patent is extended or adjusted under 35 U.S.C. 154(b) by 146 days.

(21) Appl. No.: 10/489,286

(22) PCT Filed: Sep. 11, 2002

(86) PCT No.: PCT/EP02/10165

§ 371 (c)(1),
(2), (4) Date: Sep. 27, 2004

(87) PCT Pub. No.: WO03/023262

PCT Pub. Date: Mar. 20, 2003

(65) Prior Publication Data

US 2005/0029750 A1 Feb. 10, 2005

(30) Foreign Application Priority Data

Sep. 11, 2001 (DE) ................. 101 44 576

(51) Int. Cl.
*F16D 3/84* (2006.01)
(52) U.S. Cl. ..................... 464/175; 464/903
(58) Field of Classification Search ............... 464/173, 464/175, 903; 277/635, 636; 403/50, 51
See application file for complete search history.

(56) References Cited

U.S. PATENT DOCUMENTS

| 4,560,178 A | 12/1985 | Hempel |
| 4,877,258 A | 10/1989 | Alt et al. |

(Continued)

FOREIGN PATENT DOCUMENTS

| DE | 33 09 386 C1 | 10/1984 |

(Continued)

*Primary Examiner*—Greg Binda

(57) ABSTRACT

A convoluted boot for sealing an annular gap between two parts which are connected to one another in a rotationally fast way, which can be articulated relative to one another and which are axially displaceable relative to one another, especially of a constant velocity plunging joint, consisting of includes a low-strain polymer hard material having a first larger collar (11) to be secured to a first component, a second smaller collar (12) to be secured to a second component and a plurality of annular fold units which extend between the first collar and the second collar and which, in the form of the outer folds consisting of have two annular flanks (31, 32), and form a fold peak (21) between two fold valleys (22). In a first group (A) of at least three annular folds with a connection to the first collar 11 annular folds, the diameters of the fold peaks (21) and fold valleys (22) decrease in the direction from the first collar to the second collar. In a second group (B) of annular folds with a connection to the second collar 12 of at least one fold, the diameters of the fold valleys and, optionally, of the fold peaks (21) are constant. The ratio of the diameter ($D_1$) of the fold peak (21) of the largest annular fold (A1) of the first group (A) to the diameter ($D_2$) of the second collar (12) is greater than or equal to 2.5.

20 Claims, 1 Drawing Sheet

U.S. PATENT DOCUMENTS

| | | |
|---|---|---|
| 5,236,394 A | 8/1993 | Collins et al. |
| 5,765,837 A | 6/1998 | Schwärzler |
| 6,179,717 B1 | 1/2001 | Schwarzler |
| 2005/0020366 A1 * | 1/2005 | Scholtz et al. .............. 464/175 |

FOREIGN PATENT DOCUMENTS

| | | |
|---|---|---|
| DE | 36 41 393 C1 | 3/1988 |
| DE | 43 23 686 | 2/1995 |
| DE | 43 23 686 A1 | 2/1995 |
| DE | 198 06 173 C1 | 9/1999 |
| DE | 100 36 447 A1 | 3/2001 |
| GB | 2 352 782 A | 7/2001 |

* cited by examiner

BELLOWS FOR SLIDING CONSTANT VELOCITY JOINTS

BACKGROUND

The invention relates to a convoluted boot for sealing an annular gap between two parts which are connected to one another in a rotationally fast way, which can be articulated relative to one another and which are axially displaceable relative to one another. In particular, the invention relates to a constant velocity plunging joint, having a low-strain hard polymer material, with a first larger collar to be secured to a first component, a second smaller collar to be secured to a second component and a plurality of annular fold units which extend between the first collar and the second collar. The fold units are provided in the form of outer folds which include two annular flanks and each form a fold peak between two fold valleys.

Because requirements become more and more stringent, convoluted boots of said type are produced from hard polymer materials to an increasing extent. As compared to soft resilient materials used earlier, said hard polymer materials feature an improved resistance in mechanical and chemical respects, and in view of higher speeds and the need for a longer service life, it is inevitable that they are used. One concern is their reduced flexibility which can be a problem at low temperatures. In the case of constant velocity fixed joints which effect articulation only between two rotating components, convoluted boots made of said materials, even today, do meet the respective requirements in their entirety. In the case of constant velocity plunging joints which, in addition to the angular movement, effect an axial displacement between the two rotating components, this means that the sealing convoluted boots are subject to friction contact between the annular flanks on the inside of the angle when the joint is in a telescoped and articulated condition and, when the joint is in the extended and articulated condition, the individual annular folds open up excessively widely on the outside of the angle, causing a collapsing of the annular folds or other irregularities. At high speeds, in particular, this can result in the elasticity limit of the convoluted boot being exceeded and it can lead to boot damage.

SUMMARY OF THE INVENTION

The present invention provides a convoluted boot of said type which is able to meet more stringent requirements in operation without suffering any damage and which is therefore particularly suitable for constant velocity plunging joints. The disclosure provides a convoluted boot of the initially mentioned type with the following characteristics: in a first group of annular folds joining the first collar with at least three annular folds, the diameters of the fold peaks and fold valleys decrease from the first collar to the second collar, in a second group of annular folds joining the second collar with at least one annular fold, the diameters of the fold valleys and—if more than one are present—of the fold peaks are constant, the ratio of the diameter $D_1$ of the fold peak of the largest annular fold of the first group to the diameter $D_2$ of the second collar is $\geq 2.5$; the two annular flanks of each of the annular folds of the first group (A) form angles extending in opposite directions with a radial plane (R), wherein a smaller angle $\beta 1$ is formed by the annular flank pointing to the second collar and wherein a larger angle $\alpha 1$ with $\alpha 1 \geq \beta 1 + 25°$ is formed by the annular flank pointing to the first collar; and the annular flanks of each of the annular folds of the first group (A), which annular flanks point to the first collar, are curved so as to be outwardly convex.

By providing two special groups of folds, the deformation of the convoluted boot when articulation and changes in axial length occur is allocated to said two groups in such a way that, in the first group consisting of folds of a decreasing size, deformation largely takes place in the form of the articulation of the individual annular flanks relative to one another, whereas the second group consisting of at least one annular fold with a smaller diameter largely accommodates the change in axial length as a result of the at least one annular fold being lengthened. The convex shape of the annular flanks stabilizes the annular folds of the first group in respect of being bent inwardly and largely prevents the annular flanks of the individual annular folds of the first group from rubbing against each other.

Convoluted boots with two different groups of folds are known from U.S. Pat. No. 4,560,178, DE 43 23 686 C2, U.S. Pat. No. 5,765,837 and U.S. Pat. No. 6,179,717, for example. However, in these cases, between the two groups of folds, there exists a region which is in constant contact with the inserted shaft. From DE 38 73 496 T2, there is known a convoluted boot of said type with two different functional regions, having folds whose flanks extend parallel relative to one another and, on the outside, are connected to one another by a rounded annular bead.

From U.S. Pat. No. 5,236,394, there is known a convoluted boot of said type wherein there is formed a transition fold with a fold peak and a fold valleys with smaller diameters relative to the corresponding diameters of the remaining annular folds, wherein the fold valleys of the transition fold, first, are to establish a supporting contact with a shaft shank if the convoluted boot is arranged at a universal joint and when the joint is articulated.

The annular folds according to the present invention, however, when the two collars are coaxially aligned relative to one another in the fitted condition, are contact-free relative to the inserted shaft and the annular folds each, approximately, comprise the shape of a double cone.

The first group of folds can comprise up to five annular folds and the second group of folds can comprise up to eight annular folds. The number of folds depends on the respective requirement profile regarding the angle of articulation and the change in length. With an increased number of annular folds, the need for a longer boot length also increases, but the angle work to be carried out by the individual folds generally decreases during articulation. However, this does not affect the possibility of varying the shape of the individual folds within certain ranges, i.e. that it is possible to provide more pointed and wider folds, but in principle, the folds of the first group are wider (have a larger volume) and the folds of the second group are more pointed (narrower).

According to one embodiment, between the first collar and the first annular fold (A1) of the first group (A) there is positioned a joining region whose greatest outer diameter, substantially, is not greater than that of the first collar and that the greatest outer diameter of the first annular fold (A1) of the first group, in turn, substantially, is not greater than that of the joining region. In this way, it is possible to observe small installation dimensions.

Furthermore, in particular, the annular flanks of each of the annular folds of the second group form opposed angles with a radial plane R2, wherein the annular flank pointing towards the second collar forms an angle $\beta 2$ and wherein the annular flank pointing towards the first collar forms an angle $\alpha 2$ which is defined by $\alpha 2 = (\beta 2 \pm 5°)$.

As the approximately conical annular flanks of the annular folds of the first group, which point towards the first collar, are curved so as to comprise a convex outside, it is specified hereby that the reference for the angle values has to be the conical face between the outer circumferential line of a fold valley and the outer circumferential line of a fold peak and that, if viewed in a longitudinal section, it has to be the straight line between the smallest outer radius of a fold valley and the greatest outer radius of a fold peak.

According to a further embodiment, between the annular folds of the first group and the annular folds of the second group, there is provided a transition fold whose diameters at the fold valleys deviate from one another, wherein the diameter of the annular flank pointing towards the first collar is greater than the diameter of the annular flank pointing towards the second collar. In particular, the annular flanks of the transition fold form opposed angles with a radial plane R3, wherein the annular flank pointing towards the second collar forms an angle $\beta 3$ and the annular flank pointing towards the first collar forms an angle $\alpha 3$ which is defined by $(\beta 3+25°) \geqq \alpha 3 \geqq (\beta 3+5°)$. Said transition fold is thus similar to the annular folds of the first group in that the diameter of the fold valleys decreases towards the second collar; however, as far as the angle configuration of the annular flanks is concerned, said transition fold is similar to the annular folds of the second group. The purpose is to ensure that even at larger angular movements of the convoluted boot, there is preferably no friction contact between the fold valleys and the inserted shaft.

According to another embodiment, the diameter of the fold peak of the transition fold (C) is smaller than or equal to the diameter of the fold peak of the adjoining annular fold of the first group (A) and greater than or equal to the diameter of the fold peak of the adjoining annular fold of the second group (B). Furthermore, it is advantageous for the diameters of the fold valleys of the transition (C) to be smaller than the diameters of the fold valleys of the annular flanks of the first group (A) and greater than the diameters of the fold valleys of the annular folds of the second group (B). As a result, when the universal joint associated with the convoluted boot is articulated, the transition fold remains contact-free for a longer period of time or completely, relative to an inserted shaft shank.

A preferred material for the convoluted boot is a thermoplastic elastomer (TPE); in particular, there are proposed materials based on polyurethane (TPU), on polyester (TPEE), in particular a polyether ester or a polyester ester, materials based on polyamide (TPA) or on polyolefin, in particular polypropylene or polyethylene.

BRIEF DESCRIPTION OF THE DRAWINGS

An embodiment of the convoluted boot in accordance with the invention will be described below with reference to the drawings wherein:

FIG. 1 shows an inventive convoluted boot in half a longitudinal section, with different individual characteristics having been drawn in.

DETAILED DESCRIPTION OF THE DRAWINGS

Figure 1:
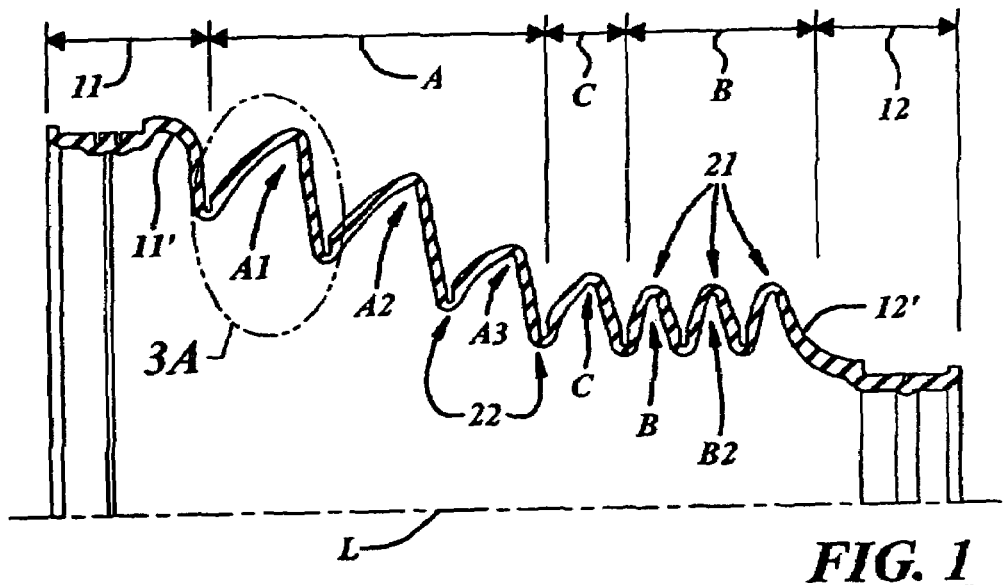

FIG. 1 shows a convoluted boot comprising a first collar 11 with a larger diameter with an attaching region 11' whose greatest outer diameter, substantially, is not greater than that of the first collar 11. A second collar 12 with a smaller diameter with a joining region 12', as well as a total of seven complete annular folds. As shown in FIG. 1, the attaching region 11' is substantially the same diameter as the first collar 11. A first group A comprises three annular folds A1, A2, A3, with the diameters of their fold valleys and fold peaks decreasing from fold to fold from the first collar 11 to the second collar 12. A second group B of two complete folds B1 and B2 and with a total of three fold peaks comprises fold valleys and fold peaks which comprise identical diameters. A third transition fold C is positioned between the first group A and the second group B and comprises fold valleys with decreasing diameters from the first collar 11 to the second collar 12. At fold A1 it is indicated that a complete annular fold is regarded as an outer fold with a fold peak 21 between two fold valleys 22.

Figure 2:
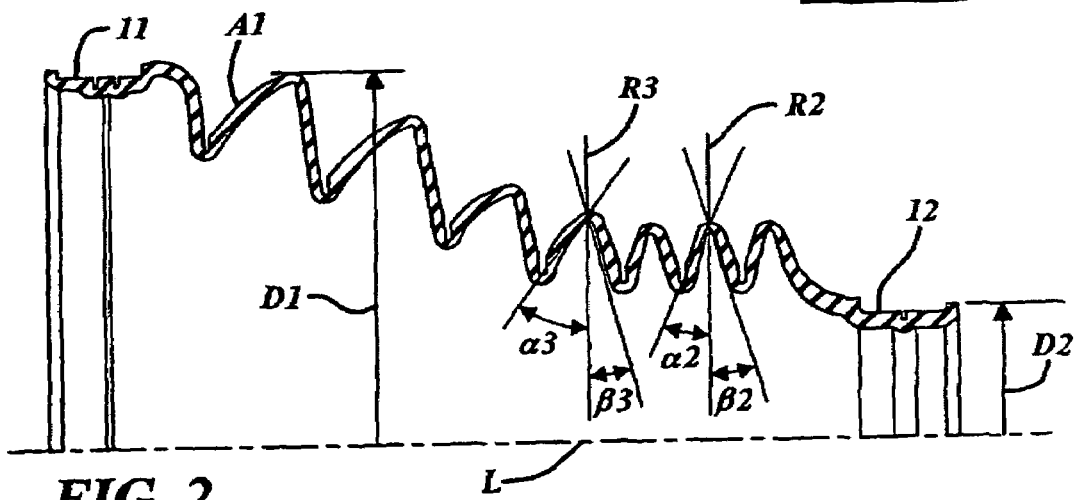
FIG. 2 shows an illustration similar to that of FIG. 1 in which the dimensions specified by the invention are given.

In FIG. 2, any details identical to those shown in FIG. 1 have been given the same reference numbers. To that extent, reference is made to the preceding description. $D_1$ refers to the outer diameter of the first fold A1 of the first group A and $D_2$ refers to the outer diameter of the second collar 12. Only one-half of $D_1$ and $D_2$ are shown, as the drawing is a half longitudinal section. In accordance with the invention, the ratio of the two diameters $D_1/D_2$ is >2.5.

Figure 3A:
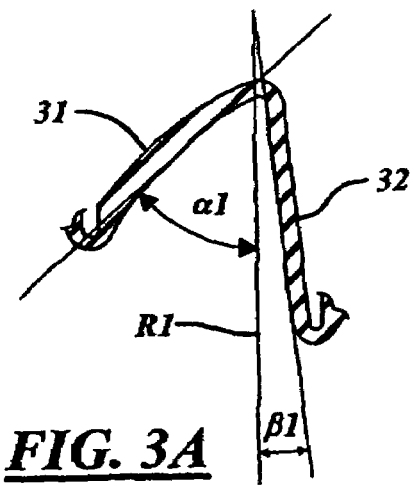
FIG. 3 shows two annular folds in half a longitudinal section, giving the values of the angles.
Figure 3B:
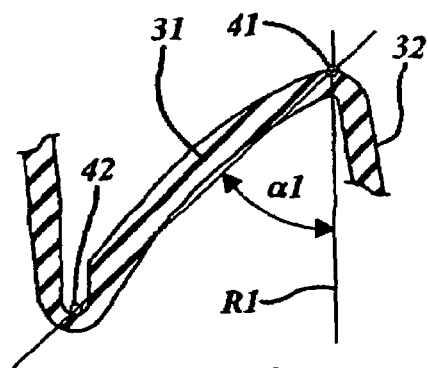

One example of determining the angles $\alpha$ and $\beta$ is shown in FIG. 3. FIG. 3 shows an individual fold, and in FIG. 3A, one fold, which can be fold A1 for example, comprises a first annular flank 31 and a second annular flank 32. A radial plane R is positioned normally on the longitudinal boot axis L. The opening angle of the first annular flank 31 relative to the radial plane R has been given the reference symbol $\alpha 1$ and the opening angle of the second annular flank 32 relative to the radial plane R has been given the reference symbol $\beta 1$. FIG. 3B shows that at an annular flank 31 with a convex outer face or, optionally, at an annular flank 32 with a concave outer face, the arm of the opening angle $\alpha 1$ deviating from the radial plane is formed by a straight line between the greatest circumferential line 41 of the fold peak and the smallest circumferential line 42 of the adjoining fold valley. FIG. 3A shows that the arm of the opening angle $\beta 1$ deviating from the radial plane is formed by a strictly conical surface of the annular flank 32 itself. The angles $\alpha 2$, $\beta 2$ and $\alpha 3$, $\beta 3$ for the second group of folds B and the transition fold C are determined in the same way. These angles are represented in FIG. 2.

The present invention provides a convoluted boot which is able to meet more stringent requirements in operation without suffering any damage and which is therefore particularly suitable for constant velocity plunging joints. As shown in FIGS. 1 and 2, in a first group of annular folds A joining the first collar 11 with at least three annular folds, the diameters of the fold peaks and fold valleys decrease from the first collar 11 to the second collar 12. In the second group of annular folds B joining the second collar 12 with at least one annular fold, the diameters of the fold valleys and—if more than one are present—of the fold peaks are constant. The ratio of the diameter $D_1$ of the fold peak of the largest annular fold of the first group A to the diameter $D_2$ of the second collar 12 is $\geqq 2.5$. The two annular flanks 31, 32 of each of the annular folds of the first group A form angles extending in opposite directions with a radial plane R, wherein a smaller angle $\beta 1$ is formed by the annular flank 32 pointing to the second collar 12 and wherein a larger angle $\alpha 1$ with $\alpha 1 \geqq \beta 1+25°$ is formed by the annular flank 31 pointing to the first collar 11. The annular flanks 31, 32 of each of the annular folds of the first group A, which annular flanks point to the first collar 11, are curved so as to be outwardly convex.

By providing two special groups of folds, the deformation of the convoluted boot when articulation and changes in axial length occur is allocated to said two groups in such a way that, in the first group A of folds of a decreasing size, deformation largely takes place in the form of the articulation of the individual annular flanks relative to one another, whereas the second group B of at least one annular fold with a smaller diameter largely accommodates the change in axial length as a result of the at least one annular fold being lengthened. The convex shape of the annular flanks 31, 32 stabilizes the annular folds of the first group A in respect of being bent inwardly and largely prevents the annular flanks of the individual annular folds of the first group A from rubbing against each other.

The annular folds according to the present invention, however, when the two collars are coaxially aligned relative to one another in the fitted condition, are contact-free relative to the inserted shaft and the annular folds each, approximately, comprise the shape of a double cone.

The first group of folds A can comprise up to five annular folds and the second group of folds B can comprise up to eight annular folds. The number of folds depends on the respective requirement profile regarding the angle of articulation and the change in length. With an increased number of annular folds, the need for a longer boot length also increases, but the angle work to be carried out by the individual folds generally decreases during articulation. However, this does not affect the possibility of varying the shape of the individual folds within certain ranges, i.e. that it is possible to provide more pointed and wider folds, but in principle, the folds of the first group A are wider (have a larger volume) and the folds of the second group are more pointed (narrower).

As shown in FIG. 2, the annular flanks of each of the annular folds of the second group B form opposed angles with a radial plane R2, wherein the annular flank pointing towards the second collar 12 forms an angle $\beta 2$ and wherein the annular flank pointing towards the first collar 11 forms an angle $\alpha 2$ which is defined by $\alpha 2 = (\beta 2 \pm 5°)$.

Also shown in FIG. 2, between the annular folds of the first group A and the annular folds of the second group B, there is provided a transition fold C whose diameters at the fold valleys deviate from one another, wherein the diameter of the annular flank pointing towards the first collar 11 is greater than the diameter of the annular flank pointing towards the second collar 12. In particular, the annular flanks of the transition fold C form opposed angles $\alpha 3$, $\beta 3$ with a radial plane R3, wherein the annular flank pointing towards the second collar 12 forms an angle $\beta 3$ and the annular flank pointing towards the first collar 11 forms an angle $\alpha 3$ which is defined by $(\beta 3 + 25°) \geq \alpha 3 \geq (\beta 3 + 5°)$. Said transition fold C is thus similar to the annular folds of the first group A in that the diameter of the fold valleys decreases towards the second collar 12; however, as far as the angle configuration of the annular flanks is concerned, said transition fold C is similar to the annular folds of the second group. The purpose is to ensure that even at larger angular movements of the convoluted boot, there is preferably no friction contact between the fold valleys and the inserted shaft (not shown).

According to another embodiment, the diameter of the fold peak of the transition fold C is smaller than or equal to the diameter of the fold peak of the adjoining annular fold A3 of the first group A and greater than or equal to the diameter of the fold peak of the adjoining annular fold B1 of the second group B. Furthermore, it is advantageous for the diameters of the fold valleys of the transition C to be smaller than the diameters of the fold valleys of the annular flanks of the first group A and greater than the diameters of the fold valleys of the annular folds of the second group B. As a result, when the universal joint associated with the convoluted boot is articulated, the transition fold remains contact-free for a longer period of time or completely, relative to an inserted shaft shank (not shown).

A preferred material for the convoluted boot is a thermoplastic elastomer (TPE); in particular, materials based on polyurethane (TPU), on polyester (TPEE), a polyether ester or a polyester ester, and materials based on polyamide (TPA) or on polyolefin, such as polypropylene or polyethylene.

The invention claimed is:

1. A convoluted boot for sealing an articulatable and plungeable joint, comprising:
    a flexible polymer material;
    a first larger collar;
    a second smaller collar; and
    a plurality of annular fold units which extend between the first collar and the second collar and which comprise outer folds having two annular flanks forming a fold peak between two fold valleys;
    wherein the fold units form a first group (A) of at least three annular folds joining the first collar, the diameters of the fold peaks and fold valleys decreasing in the direction from the first collar to the second collar, and a second group (B) of at least two annular folds joining the second collar, the diameters of the fold valleys and the fold peaks of the second group (B) being substantially constant; and
    wherein the two annular flanks of each of the annular folds of the first group (A) form opposed angles with a radial plane (R1), wherein a smaller angle ($\beta 1$) is formed by the annular flank pointing towards the second collar and wherein a larger angle ($\alpha 1$) with $\alpha 1 \geq (\beta 1 + 25°)$ is formed by the annular flank pointing towards the first collar, and the annular flanks of each of the annular folds of the first group (A) which point to the first collar are curved so as to be outwardly convex; and
    wherein a ratio of a diameter ($D_1$) of the fold peak of largest annular fold of the first group (A) to a diameter ($D_2$) of the second collar is $\geq 2.5$.

2. A convoluted boot according to claim 1, wherein the first group (A) comprises up to five annular folds.

3. A convoluted boot according to claim 2, wherein the second group (B) comprises up to eight annular folds.

4. A convoluted boot according to claim 3, wherein the annular flanks of each of the annular folds of the second group (B) form opposed angles with a radial plane, wherein the annular flank pointing towards the second collar forms a first angle ($\beta 2$) and wherein the annular flank pointing towards the first collar forms a second angle ($\alpha 2$) which is defined by $\alpha 2 = (\beta 2 \pm 5°)$.

5. A convoluted boot according to claim 1 comprising, between the first collar and a first annular fold of the first group (A), a joining region whose greatest outer diameter is substantially equal to that of the first collar.

6. A convoluted boot according to claim 1, wherein the second group (B) comprises up to eight annular folds.

7. A convoluted boot according to claim 6, wherein the annular flanks of each of the annular folds of the second group (B) form opposed angles with a radial plane, wherein the annular flank pointing towards the second collar forms a first angle (β2) and wherein the annular flank pointing towards the first collar forms a second angle (α2) which is defined by α2=(β2±5°).

8. A convoluted boot according to claim 7 comprising, between the annular folds of the first group (A) and the annular folds of the second group (B), a transition fold (C) whose diameters at the fold valleys deviate from one another, wherein the diameter of the fold valley at the annular flank (31) pointing towards the first collar is greater than the diameter of the fold valley at the annular flank pointing towards the second collar.

9. A convoluted boot according to claim 8, wherein the annular flanks of the transition fold (C) form opposed angles with a radial plane (R3), wherein the annular flank pointing towards the second collar forms a first angle (β3) and wherein the annular flank pointing towards the first collar forms a second angle (α3) which is defined by (β3+25°)≧α3≧(β3+5°).

10. A convoluted boot according to claim 1 comprising, between the annular folds of the first group (A) and the annular folds of the second group (B), a transition fold (C) whose diameters at the fold valleys deviate from one another, wherein the diameter of the fold valley at the annular flank pointing towards the first collar is greater than the diameter of the fold valley at the annular flank pointing towards the second collar.

11. A convoluted boot according to claim 10, wherein the annular flanks of the transition fold (C) form opposed angles with a radial plane (R3), wherein the annular flank pointing towards the second collar forms a first angle (β3) and wherein the annular flank pointing towards the first collar forms a second angle (α3) which is defined by (β3+25°)≧α3≧(β3+5°).

12. A convoluted boot according to claim 11, wherein the diameter of the fold peak of the transition fold (C) is less than or equal to the diameter of the fold peak of an adjoining annular fold of the first group (A) and greater than or equal to the diameter of the fold peak of an adjoining annular fold of the second group (B).

13. A convoluted boot according to claim 11, wherein the diameters of the fold valleys of the transition fold (C) are less than the diameters of the fold valleys of the annular folds of the first group (A), and greater than the diameters of the fold valleys of the annular folds of the second group (B).

14. A convoluted boot according to claim 10, wherein the diameter of the fold peak of the transition fold (C) is less than or equal to the diameter of the fold peak of an adjoining annular fold of the first group (A) and greater than or equal to the diameter of the fold peak of an adjoining annular fold of the second group (B).

15. A convoluted boot according to claim 14, wherein the diameters of the fold valleys of the transition fold (C) are less than the diameters of the fold valleys of the annular folds of the first group (A), and greater than the diameters of the fold valleys of the annular folds of the second group (B).

16. A convoluted boot according to claim 10, wherein the diameters of the fold valleys of the transition fold (C) are less than the diameters of the fold valleys of the annular folds of the first group (A), and greater than the diameters of the fold valleys of the annular folds of the second group (B).

17. A convoluted boot according to claim 1, wherein the convoluted boot comprises a thermoplastic elastomer (TPE).

18. A convoluted boot according to claim 17, wherein the material comprises a TPE based on at least one of a polyurethane (TPU), a polyester (TPEE), a polyamide (TPA), or a polyolefin (TPO).

19. A convoluted boot according to claim 18, wherein the TPEE is a polyether ester or a polyester ester.

20. A convoluted boot according to claim 18, wherein the TPO is a polypropylene or a polyethylene.

* * * * *

UNITED STATES PATENT AND TRADEMARK OFFICE
CERTIFICATE OF CORRECTION

PATENT NO.       : 7,235,018 B2
APPLICATION NO.  : 10/489286
DATED            : June 26, 2007
INVENTOR(S)      : Markus Deisinger et al.

It is certified that error appears in the above-identified patent and that said Letters Patent is hereby corrected as shown below:

In Claim 8, column 7, line 9, please delete "(31)"

Signed and Sealed this

Twenty-sixth Day of May, 2009

JOHN DOLL
*Acting Director of the United States Patent and Trademark Office*